US012803097B2

(12) United States Patent
Choi et al.

(10) Patent No.: US 12,803,097 B2
(45) Date of Patent: Nov. 17, 2026

(54) BATTERY MODULE AND BATTERY PACK INCLUDING THE SAME

(71) Applicant: LG Energy Solution, Ltd., Seoul (KR)

(72) Inventors: Jonghwa Choi, Daejeon (KR); Junyeob Seong, Daejeon (KR); Myungki Park, Daejeon (KR); Seung Ryul Baek, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 758 days.

(21) Appl. No.: 17/440,423

(22) PCT Filed: Jul. 10, 2020

(86) PCT No.: PCT/KR2020/009089
§ 371 (c)(1),
(2) Date: Sep. 17, 2021

(87) PCT Pub. No.: WO2021/080124
PCT Pub. Date: Apr. 29, 2021

(65) Prior Publication Data

US 2022/0158290 A1 May 19, 2022

(30) Foreign Application Priority Data

Oct. 24, 2019 (KR) ........................ 10-2019-0133054
Jul. 6, 2020 (KR) ........................ 10-2020-0082995

(51) Int. Cl.
*H01M 50/258* (2021.01)
*H01M 50/242* (2021.01)
(Continued)

(52) U.S. Cl.
CPC ....... *H01M 50/258* (2021.01); *H01M 50/242* (2021.01); *H01M 50/262* (2021.01); *H01M 50/271* (2021.01); *H01M 50/505* (2021.01)

(58) Field of Classification Search
CPC .......... Y02E 60/10; Y02P 70/50; Y02T 10/70; H01M 50/211; H01M 50/20;
(Continued)

(56) References Cited

U.S. PATENT DOCUMENTS 10,062,876 B2 8/2018 Wuensche et al.
2010/0021802 A1 1/2010 Yang et al.
(Continued)

FOREIGN PATENT DOCUMENTS

CN 101395737 A 3/2009
CN 103931019 A 7/2014
(Continued)

OTHER PUBLICATIONS

CN-208127288-U—English Translation (Year: 2018).*
(Continued)

*Primary Examiner* — Mayla Gonzalez Ramos
*Assistant Examiner* — Bethany C Garcia
(74) *Attorney, Agent, or Firm* — Lerner David LLP

(57) ABSTRACT

A battery module according to an embodiment of the present disclosure includes: a battery cell stack having a plurality of battery cells stacked in a stacking direction, a module frame accommodating the battery cell stack and having an opened upper portion; an upper plate covering the battery cell stack on the upper portion of the module frame, a busbar frame connected to the battery cell stack, and an end plate located on both sides of the battery cell stack, wherein the module frame has a structure for opening the battery cell stack along the stacking direction, and wherein the end plate covers a stacked surface of the battery cell stack on open both sides of the module frame.

19 Claims, 7 Drawing Sheets

(51) Int. Cl.

| | |
|---|---|
| ***H01M 50/262*** | (2021.01) |
| ***H01M 50/271*** | (2021.01) |
| ***H01M 50/505*** | (2021.01) |

(58) Field of Classification Search

CPC .. H01M 50/209; H01M 50/24; H01M 50/244; H01M 50/507; H01M 50/264; H01M 50/204; H01M 50/262; H01M 50/242; H01M 50/249; H01M 50/593; H01M 50/564; H01M 10/653; H01M 10/647; H01M 10/613; H01M 10/658; H01M 10/655; H01M 2220/20; H01M 50/233–244; H01M 50/258–262; H01M 50/183; H01M 50/289–293; H01M 50/184; H01M 50/186; H01M 10/04; H01M 50/569; H01M 50/548; H01M 10/0413; H01M 10/0486; H01M 10/48; H01M 50/166–171; H01M 50/147–15; H01M 50/502; H01M 50/50; H01M 50/64; H01M 4/00–2300/0097; H01M 50/505; H01M 50/224; H01M 50/271–287; B60L 58/26; B60L 50/64

See application file for complete search history.

(56) References Cited

U.S. PATENT DOCUMENTS

| | | | | |
|---|---|---|---|---|
| 2014/0242429 | A1 | 8/2014 | Lee et al. | |
| 2015/0140406 | A1 | 5/2015 | Kim et al. | |
| 2015/0280190 | A1* | 10/2015 | Ohshiba | H01M 50/209 429/100 |
| 2015/0295214 | A1* | 10/2015 | Cho | H01M 50/249 429/151 |
| 2016/0036103 | A1* | 2/2016 | Yamamoto | H01M 10/6556 429/120 |
| 2016/0126531 | A1 | 5/2016 | Kim et al. | |
| 2017/0125753 | A1* | 5/2017 | Kim | H01M 50/289 |
| 2017/0190264 | A1 | 7/2017 | Kim et al. | |
| 2018/0013110 | A1 | 1/2018 | Wuensche et al. | |
| 2019/0131596 | A1 | 5/2019 | Yang et al. | |
| 2020/0067040 | A1* | 2/2020 | Kim | H01M 10/486 |
| 2020/0076025 | A1 | 3/2020 | Jo et al. | |
| 2020/0161606 | A1 | 5/2020 | Yu et al. | |
| 2020/0176745 | A1 | 6/2020 | Lee | |
| 2021/0050566 | A1* | 2/2021 | Wang | H01M 50/287 |

FOREIGN PATENT DOCUMENTS

| | | | | | |
|---|---|---|---|---|---|
| CN | 107706325 | A | * | 2/2018 | B60L 58/10 |
| CN | 207818701 | U | | 9/2018 | |
| CN | 208127288 | U | * | 11/2018 | H01M 10/425 |
| CN | 109920944 | A | | 6/2019 | |
| CN | 208955070 | U | | 6/2019 | |
| EP | 2874201 | A1 | | 5/2015 | |
| JP | 2013229266 | A | | 11/2013 | |
| JP | 5916500 | B2 | | 5/2016 | |
| KR | 20140084487 | A | | 7/2014 | |
| KR | 101447062 | B1 | | 11/2014 | |
| KR | 20150044599 | A | | 4/2015 | |
| KR | 20150057261 | A | | 5/2015 | |
| KR | 20150142338 | A | | 12/2015 | |
| KR | 101916720 | B1 | | 11/2018 | |
| KR | 20190054709 | A | | 5/2019 | |
| KR | 20190064887 | A | | 6/2019 | |
| KR | 20190092835 | A | | 8/2019 | |
| KR | 102007699 | B1 | | 10/2019 | |
| WO | 2019121572 | A1 | | 6/2019 | |

OTHER PUBLICATIONS

CN-107706325—English Translation—Accessed via Espacenet—Sep. 18, 2024 (Year: 2024).*

International Search Report for PCT/KR2020/009089 dated Oct. 29, 2020. 2 pgs.

Search Report dated Mar. 2, 2023 from the Office Action for Chinese Application No. 202080031684.5 issued Mar. 6, 2023, pp. 1-3.

Extended European Search Report including Written Opinion for Application No. 20878274.8 dated Apr. 8, 2022, pp. 1-8.

* cited by examiner

【FIG. 1】
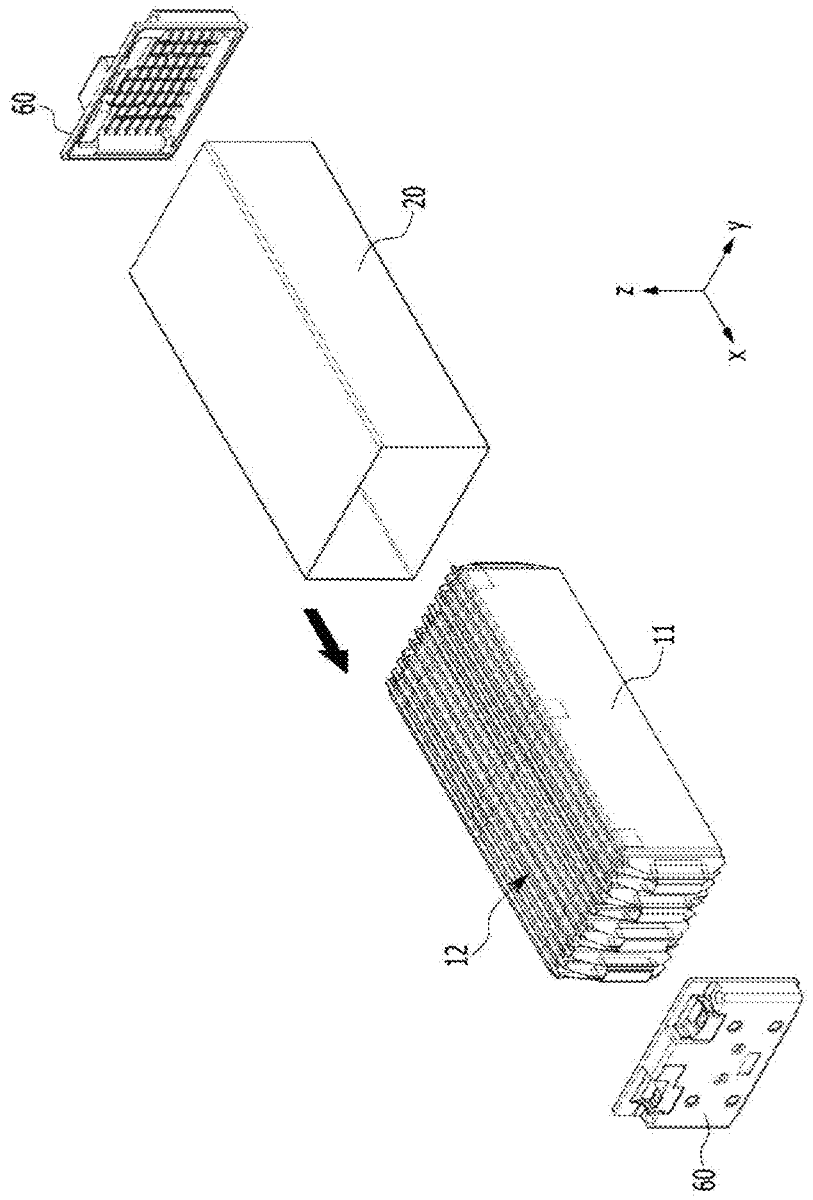
PRIOR ART

【FIG. 2】
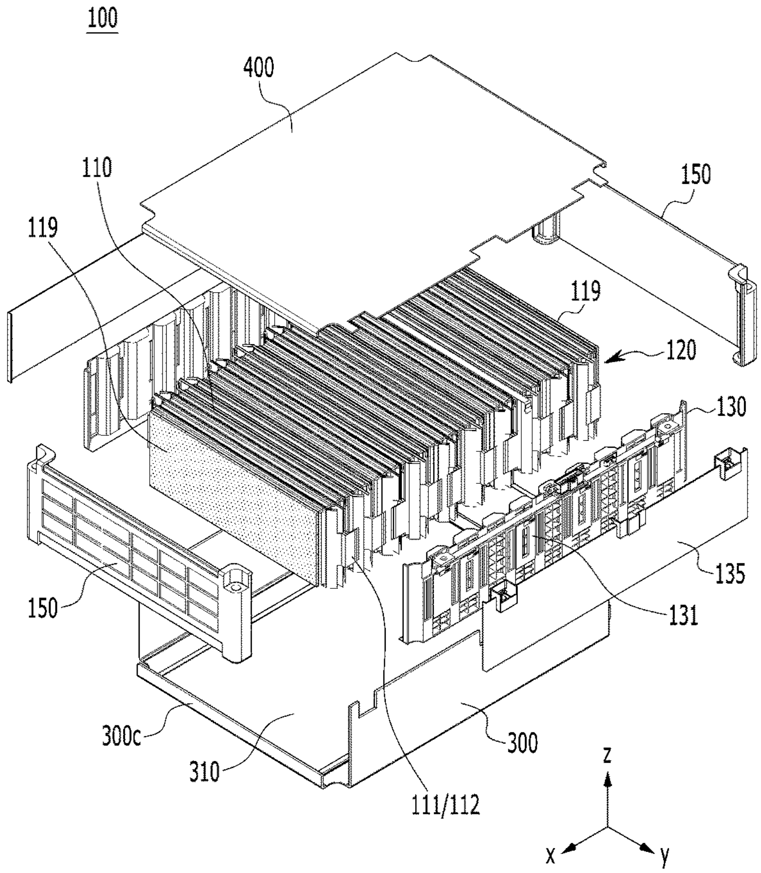
【FIG. 3】
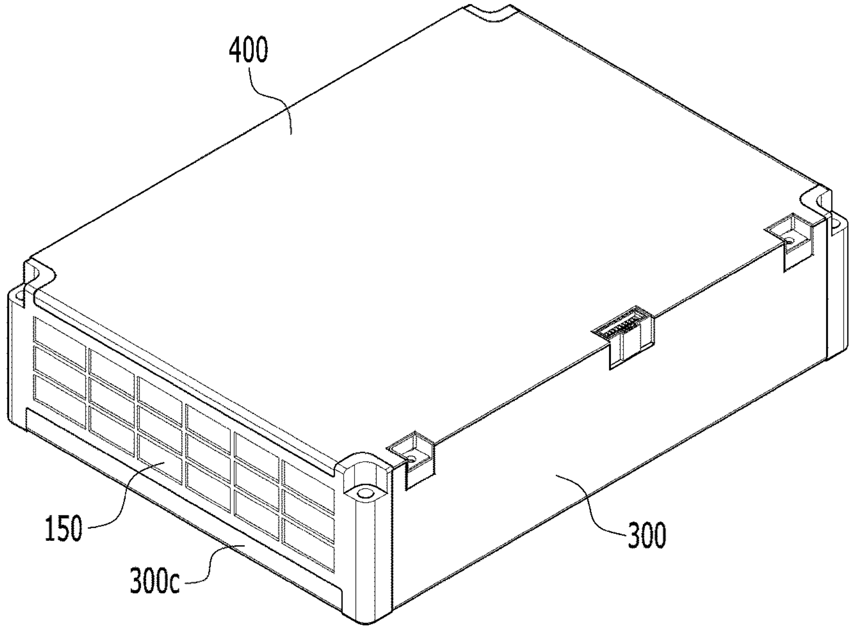

【FIG. 4】
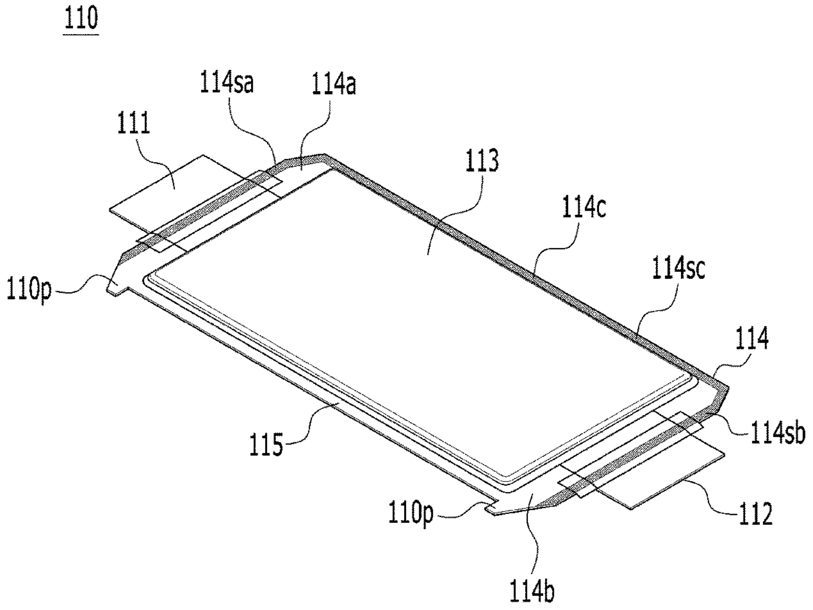
【FIG. 5】
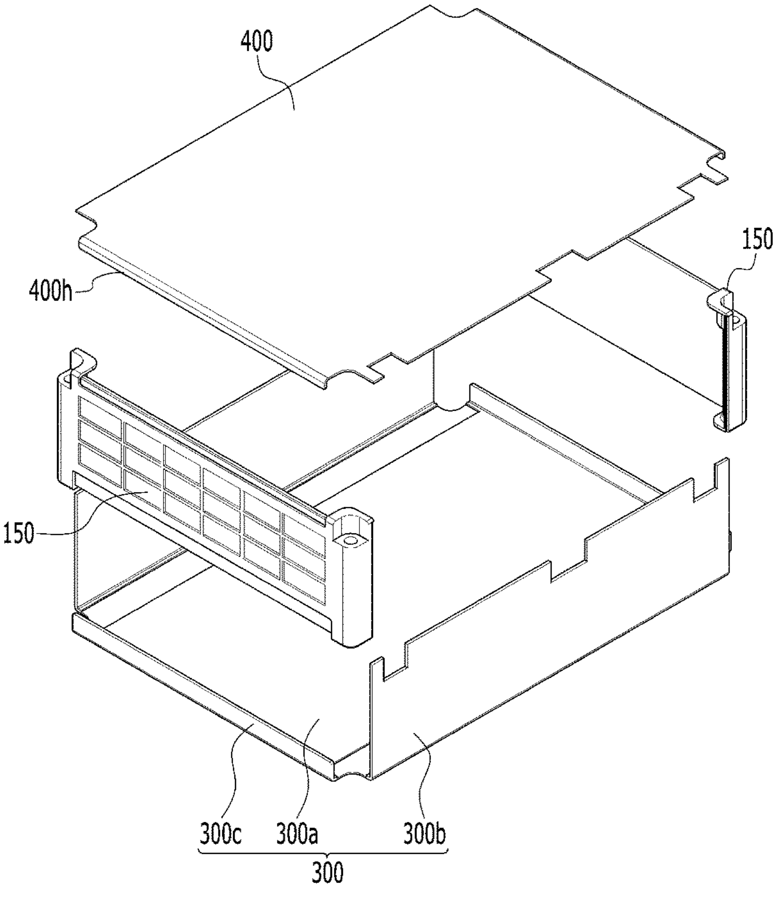

【FIG. 6】
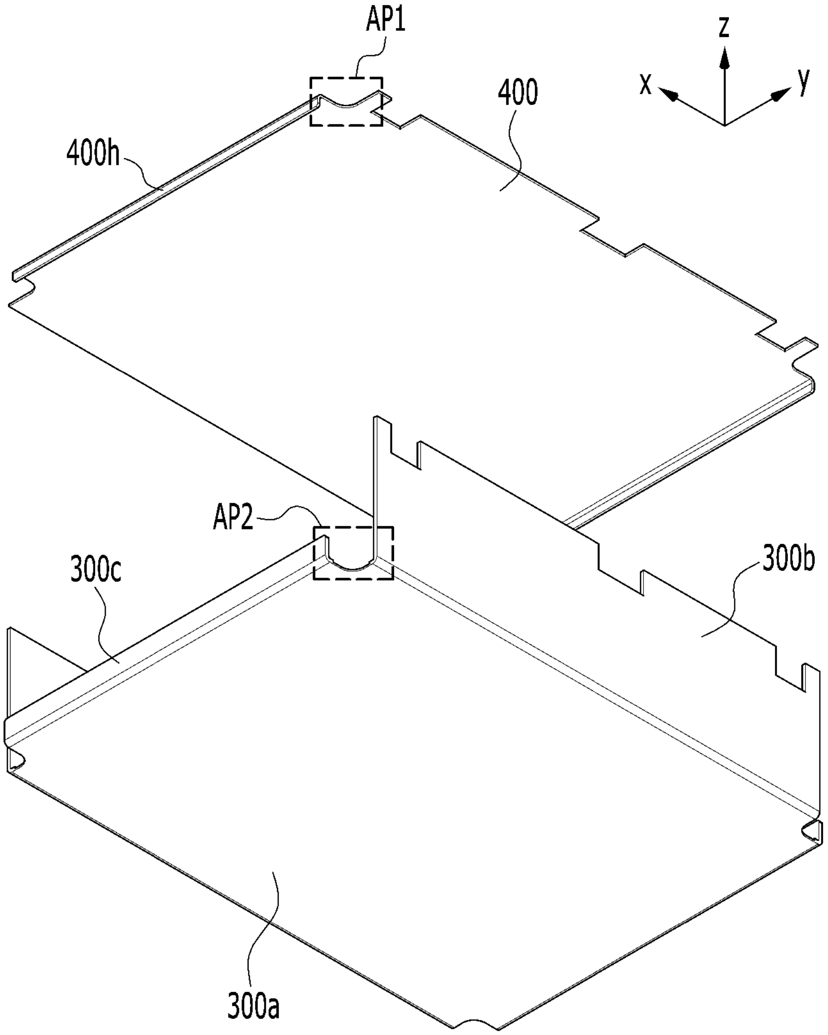

【FIG. 7】
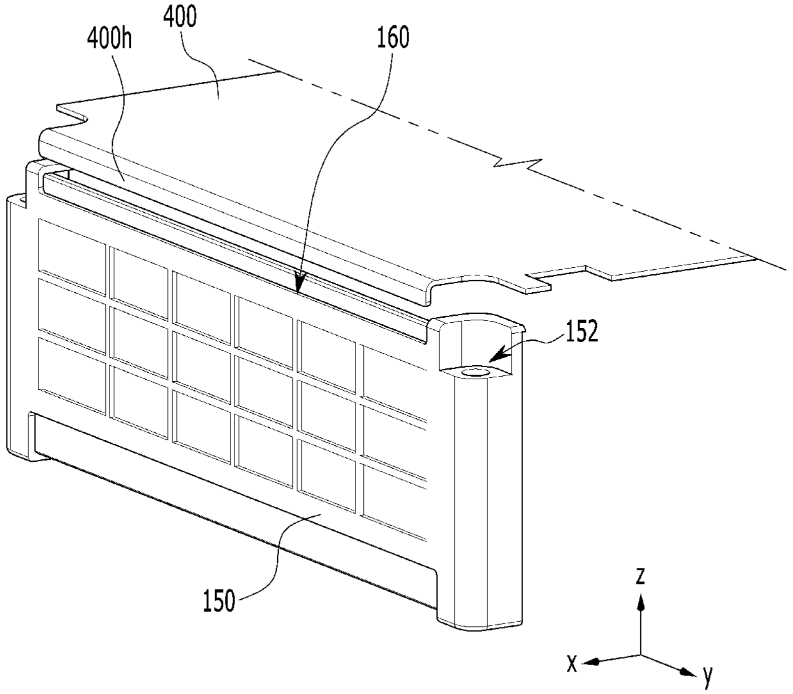
【FIG. 8】
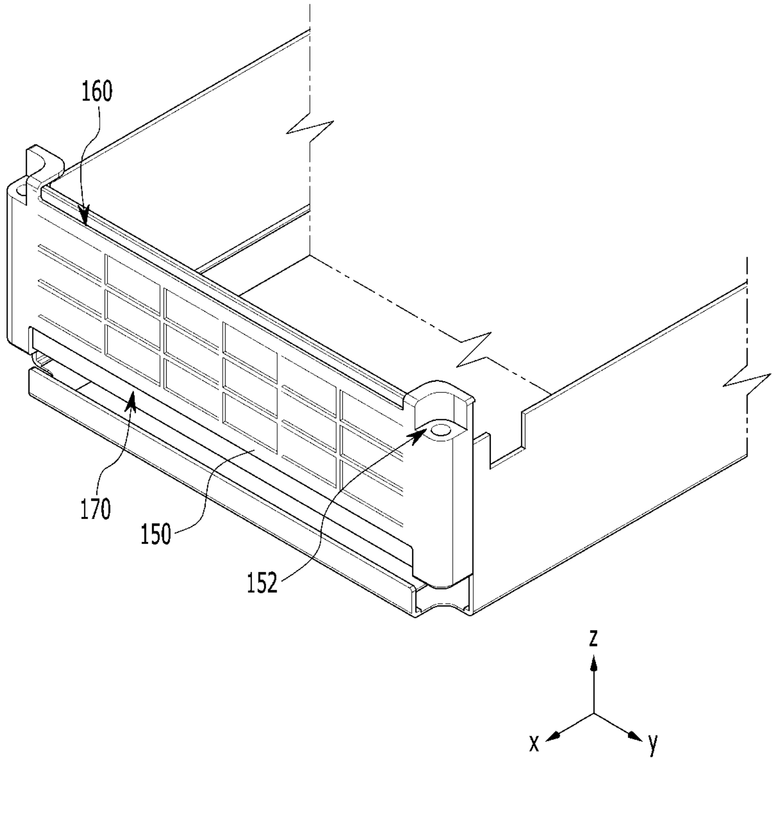

【FIG. 9】
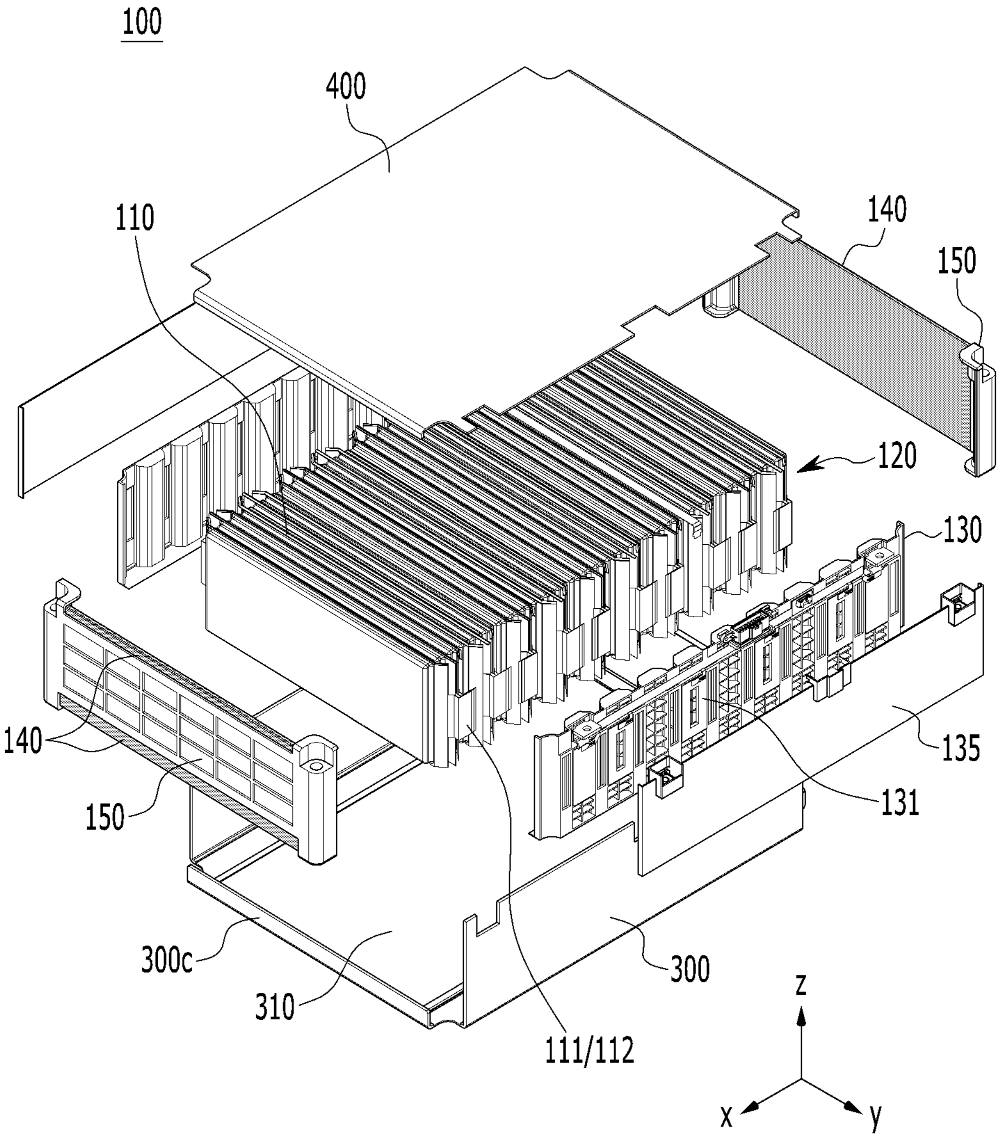

【FIG. 10】
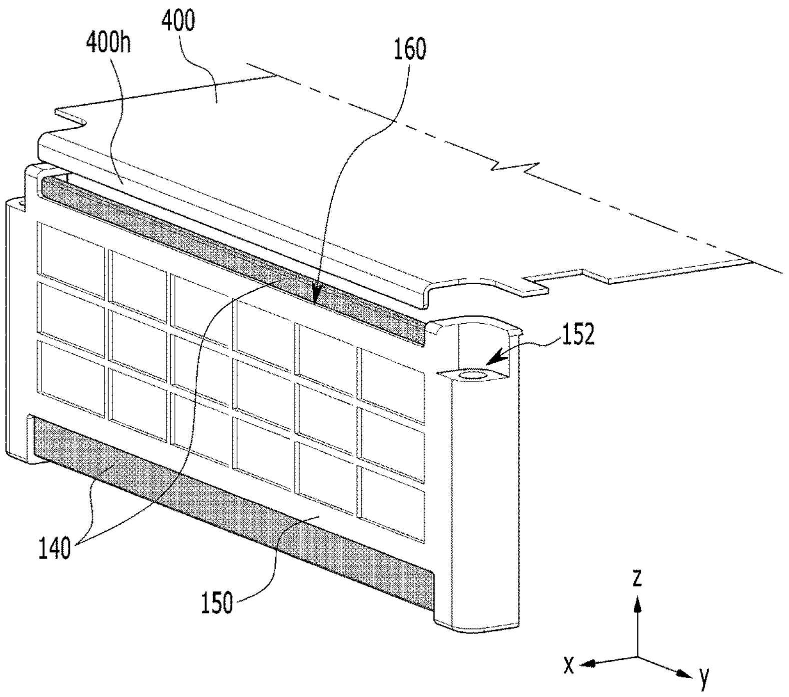
【FIG. 11】
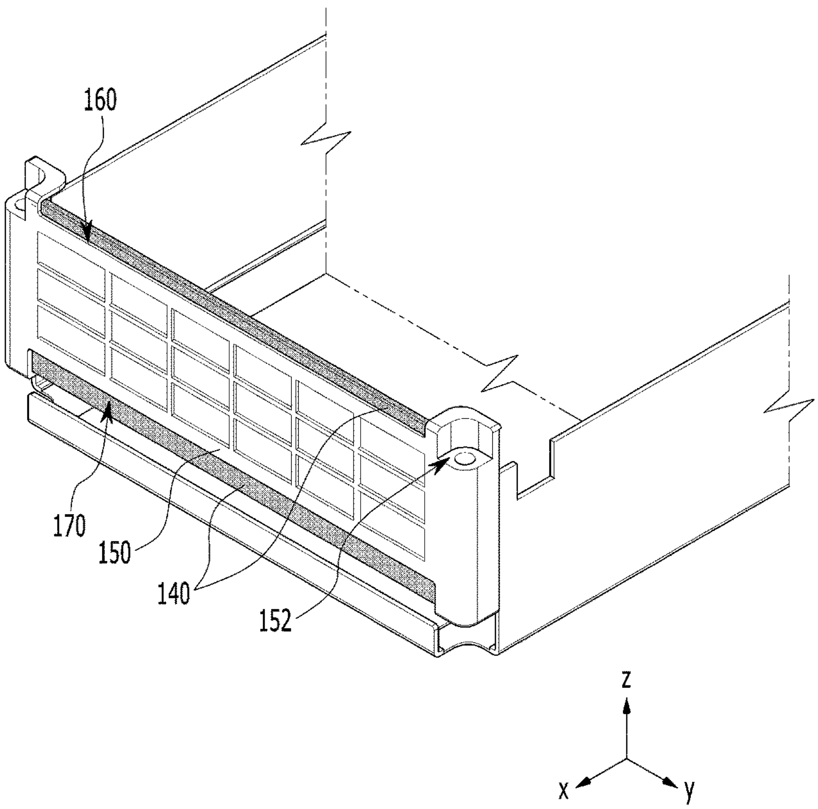

BATTERY MODULE AND BATTERY PACK INCLUDING THE SAME

CROSS-REFERENCE TO RELATED APPLICATIONS

This application is a national phase entry under 35 U.S.C. § 371 of PCT/KR2020/009089 filed on Jul. 10, 2020 and claims the benefit of Korean Patent Application No. 10-2019-0133054 filed on Oct. 24, 2019 and Korean Patent Application No. 10-2020-0082995 filed on Jul. 6, 2020, the disclosures of which are all incorporated herein by reference in their entirety.

TECHNICAL FIELD

The present disclosure relates to a battery module and a battery pack including the same, and more particularly, to a battery module having a new structure for preventing swelling of a battery cell, and a battery pack including the same.

BACKGROUND ART

Secondary batteries, which are easily applicable to various product groups and has electrical characteristics such as high energy density, are universally applied not only for a portable device but also for an electric vehicle or a hybrid electric vehicle, an energy storage system or the like, which is driven by an electric driving source. Such secondary battery is attracting attention as a new environment-friendly energy source for improving energy efficiency since it gives a primary advantage of remarkably reducing a use of fossil fuel and also does not generate by-products from the use of energy at all.

In small-sized mobile devices, one or several battery cells are used per device, while in middle- or large-sized devices such as vehicles, high output and large capacity is necessary. Thus, a middle- or large-sized battery pack in which a large number of battery cells are electrically connected is used.

Preferably, the middle- or large-sized battery module is manufactured so as to have as small a size and weight as possible. Consequently, a prismatic battery or a pouch-shaped battery, which can be stacked with high integration and has a small weight relative to capacity, is usually used as a battery cell of the middle- or large-sized battery module. Meanwhile, in order to protect the cell stack from external shock, heat, or vibration, the battery module may include a frame member whose front and back surfaces are opened so as to accommodate the battery cell stack in an internal space.

FIG. 1 is a perspective view illustrating a battery module having a mono frame according to the related art.

Referring to FIG. 1, the battery module may include a battery cell stack 12 formed by stacking a plurality of battery cells 11, a mono frame 20 whose front and rear surfaces are opened to cover the battery cell stack 12, and end plates 60 covering the front and rear surfaces of the mono frame 20. In order to form such a battery module, it is necessary to horizontally insert the battery cell stack 12 into the opened front or rear surfaces of the mono frame 20 along the X-axis direction as shown by the arrow in FIG. 1. However, in order to stably perform such a horizontal assembly, sufficient clearance must be secured between the battery cell stack 12 and the mono frame 20. Herein, the clearance refers to a gap generated by press-fitting or the like. When the clearance is small, it may lead to a damage of components in the process of the horizontal assembly. Therefore, a height of the mono frame 20 should be designed to be larger in consideration of a maximum height of the battery cell stack 12 and an assembly clearance in the inserting process. Therefore, an unnecessarily wasted space may occur.

In addition, in order to control swelling of a battery cell, the thickness of the frame member needs to be increased, which causes a problem that space utilization is deteriorated.

DETAILED DESCRIPTION OF THE INVENTION

Technical Problem

The present disclosure has been devised to solve that above-mentioned problems, and an object of the present disclosure is to provide a battery module having a new structure for preventing swelling of a battery cell, and a battery pack including the same.

However, the problem to be solved by embodiments of the present disclosure is not limited to the above-described problems, and can be variously expanded within the scope of the technical idea included in the present disclosure.

Technical Solution

A battery module according to an embodiment of the present disclosure includes: a battery cell stack having a plurality of battery cells stacked in a stacking direction, a module frame accommodating the battery cell stack and having an opened upper portion, an upper plate covering the battery cell stack on the upper portion of the module frame, a busbar frame connected to the battery cell stack, and an end plate located on both sides of the battery cell stack, wherein the module frame has a structure for opening the battery cell stack along the stacking direction, and wherein the end plate covers a surface of the battery cell stack on open both sides of the module frame.

The module frame may include a bottom portion and two side surface portions facing each other, and the busbar frame may be located between the side surface portion and the battery cell stack.

The end plate may be located in a direction perpendicular to the stacking

The battery module may further include an insulating plate located between the busbar frame and a side surface portion of the module frame.

A first hooking portion protruding downward may be formed on both sides of the upper plate.

The end plate may have a first stepped portion formed at the upper end part, and the first hooking portion may be hooked to the first stepped portion.

A second hooking portion protruding upward is formed on both sides of the bottom portion of the module frame.

A second stepped portion may be formed at the lower end part of the end plate, and the second hooking portion may be hooked to the second stepped portion.

The first stepped portion and the second stepped portion may form a groove structure at each of an upper end part and a lower end part of the end plate.

The end plate may have a module mounting portion formed on both outer edges of the first stepped portion.

A first cut-out part may be formed in the upper plate to correspond to the module mounting portion, and the upper end part of the module mounting portion is opened by the first cut-out part.

A second cut-out portion may be formed at the bottom portion of the module frame to correspond to the module mounting portion, and the lower end part of the module mounting portion may be opened by the second cut-out part.

The battery module may include a compression pad located between the end plate and the battery cell stack.

The battery module may include an insulating cover located between the end plate and the battery cell stack.

The width of the insulating cover in a Z-axis direction, perpendicular to the stacking direction, may be larger than the width of the end plate in the Z-axis direction, a first stepped portion may be formed between an upper end part of the insulating cover in the Z-axis direction and an upper end part of the end plate, and the first hooking portion may be hooked to the first stepped portion.

A second hooking portion projecting upward may be formed on both sides of the bottom portion of the module frame.

A second stepped portion may be formed at a lower end part of the insulating cover in the Z-axis direction and a lower end part of the end plate, and the second hooking portion may be hooked to the second stepped portion.

The end plate may be formed of a metal material.

A battery pack according to another embodiment of the present disclosure includes the above-mentioned battery module.

Advantageous Effects

According to the embodiments, it is possible to improve a space utilization rate while effectively controlling swelling of a battery cell by implementing a battery module having a new structure.

BRIEF DESCRIPTION OF THE DRAWINGS

FIG. 1 is an exploded perspective view illustrating a battery module having a module frame according to the related art.

FIG. 2 is an exploded perspective view illustrating a battery module according to an embodiment of the present disclosure.

FIG. 3 is a perspective view illustrating a state in which the components of the battery module of FIG. 2 are coupled.

FIG. 4 is a perspective view illustrating one battery cell contained in the battery cell stack of FIG. 2.

FIG. 5 is an exploded perspective view of the module frame, the upper plate, and the end plate in the battery module of FIG. 3 as viewed obliquely from the upper side.

FIG. 6 is an exploded perspective view of the module frame and the upper plate in the battery module of FIG. 3 as viewed obliquely from the lower side.

FIG. 7 is a perspective view illustrating a coupling relationship between an upper plate and an end plate in the battery module of FIG. 3.

FIG. 8 is a perspective view illustrating a coupling relationship between a module frame and an end plate in the battery module of FIG. 3.

FIG. 9 is an exploded perspective view illustrating a battery module according to another embodiment of the present disclosure.

FIG. 10 is a perspective view illustrating a coupling relationship between an upper plate and an end plate in the battery module of FIG. 9.

FIG. 11 is a perspective view illustrating a coupling relationship between a module frame and an end plate in the battery module of FIG. 9.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the figures, the size and thickness of each element are arbitrarily illustrated for convenience of description, and the present disclosure is not necessarily limited to those illustrated in the drawings. In the figures, the thickness of layers, regions, etc. are exaggerated for clarity. In the drawings, for convenience of description, the thicknesses of some layers and regions are shown to be exaggerated.

In addition, it will be understood that when an element such as a layer, film, region, or plate is referred to as being “on” or “above” another element, it can be directly on the other element or intervening elements may also be present. In contrast, when an element is referred to as being “directly on” another element, it means that other intervening elements are not present. Further, the word “on” or “above” means disposed on or below a reference portion, and does not necessarily mean being disposed on the upper end of the reference portion toward the opposite direction of gravity.

Further, throughout the specification, when a portion is referred to as “including” a certain component, it means that it can further include other components, without excluding the other components, unless otherwise stated.

Further, throughout the specification, when referred to as “planar”, it means when a target portion is viewed from the top, and when referred to as “cross-sectional”, it means when a target portion is viewed from the side of a cross section cut vertically.

FIG. 2 is an exploded perspective view illustrating a battery module according to an embodiment of the present disclosure. FIG. 3 is a perspective view illustrating a state in which the components of the battery module of FIG. 2 are coupled. FIG. 4 is a perspective view illustrating one battery cell contained in the battery cell stack of FIG. 2. FIG. 5 is an exploded perspective view of the module frame, the upper plate, and the end plate in the battery module of FIG. 3 as viewed obliquely from the upper side. FIG. 6 is an exploded perspective view of the module frame and the upper plate in the battery module of FIG. 3 as viewed obliquely from the lower side.

Referring to FIGS. 2 and 3, the battery module 100 according to the present embodiment may include a battery cell stack 120, in which a plurality of battery cells 110 are stacked, a module frame 300 accommodating the battery cell stack 120, an upper plate 400 covering the opened upper portion of the module frame 300, and an end plate 150 covering the front surface and the rear surface of the module frame 300. The end plate 150 may be formed of a metal material such as aluminum. The end plate 150 may include a front surface plate covering one side of the module frame 300 and a back surface plate covering the other side of the module frame 300.

The module frame 300 may be a U-shaped frame, and when the open both sides of the U-shaped frame are referred to as a first side and a second side, the module frame 300 is configured as a plate shaped structure bent to continuously surround the front, lower and rear surfaces adjacent to each other among the remaining outer surfaces except for the surfaces of the battery cell stack 120 corresponding to the first side and the second side. The upper surface corresponding to the lower surface of the module frame 300 is opened. In the present embodiment, the module frame 300 has a structure in which the battery cell stack 120 is opened along the stacking direction of the battery cell 110 contained in the battery cell stack 120. At this time, the end plate 150 covers the stacked surfaces of the battery cell stack 120 on open both sides of the module frame 300.

The battery module 100 according to the present embodiment may further include a busbar frame 130 located between the side surface portion of the module frame 300 and the battery cell stack 120, and may further include an insulating plate 135 located between the busbar frame 130 and the side surface portion of the module frame 300. The insulating plate 135 has a function of allowing the electrode leads 111 and 112 and the busbar 131 to be insulated from the module frame 300. The insulating plate 135 may be formed of a plastic injection-molded material.

Referring to FIGS. 2, 5 and 6, the module frame 300 according to the present embodiment includes a bottom portion 300*a* and two side surface portions 300*b* facing each other. Further, before the battery cell stack 120 is mounted on the bottom portion 300*a* of the module frame 300, the battery module 100 according to the present embodiment further includes a thermally conductive resin layer 310 formed by applying a thermally conductive resin to the bottom portion 300*a* of the module frame 300 and curing the thermally conductive resin.

The upper plate 400 according to the present embodiment includes a first hooking portion 400*h* protruding downward from both sides thereof. Both sides of the upper plate 400 on which the first hooking portion 400*h* is formed correspond to both sides in the X-axis direction, which is a direction in which the battery cell stack 120 is stacked. The module frame 300 according to the present embodiment further includes a second hooking portion 300*c* formed on the first side and the second side of the module frame 300, respectively. The second hooking part 300*c* may be formed in a structure protruding upward from one end of the bottom portion 300*a* of the module frame 300. The first side and the second side of the module frame 300 correspond to both sides in the X-axis direction, which is a direction in which the battery cell stack 120 is stacked.

As shown in FIG. 6, a first cut-out part AP1 is formed in the upper plate 400 according to the present embodiment. The first cut-out part AP1 may be formed adjacent to both end parts of the first hooking portion 400*h*, and may be formed at four corners of the upper plate 400. A second cut-out part AP2 is formed in the bottom portion 300*a* of the module frame 300 according to the present embodiment. The second cut-out part AP2 may be formed adjacent to both end parts of the second hooking portion 300*c* and may be formed at four corners of the bottom portion 300*a* of the module frame 300.

The upper plate 400 has a single plate-shaped structure that encloses the remaining upper surface excluding the front, lower and rear surfaces that are surrounded by the module frame 300. The module frame 300 and the upper plate 400 may form a structure that encloses the battery cell stack 120 by being coupled by welding or the like in a state in which the corresponding corner portions are in contact with each other. That is, the module frame 300 and the upper plate 400 may have a coupling portion formed at a corner portion corresponding to each other by a coupling method such as welding.

The battery cell stack 120 includes a plurality of battery cells 110 stacked in one direction, and the plurality of battery cells 110 may be stacked in the X-axis direction as shown in FIG. 2. The battery cell 110 is preferably a pouch-type battery cell. For example, referring to FIG. 4, the battery cell 110 according to the present embodiment has a structure in which two electrode leads 111 and 112 face each other, and are protruded from one end part 114*a* of the battery body 113 and the other end part 114*b*. The battery cell 110 can be manufactured by bonding both end parts 114*a* and 114*b* of the case 114 and a side portion 114*c* connecting them in a state in which the electrode assembly (not shown) is housed in the battery case 114. In other words, the battery cell 110 according to the present embodiment has a total of three sealing portions 114*sa*, 114*sb* and 114*sc*, wherein the sealing portions 114*sa*, 114*sb* and 114*sc* are formed to be sealed by a method such as thermal fusion, and the remaining other side portion may be formed of the connecting portion 115. Between both end parts 114*a* and 114*b* of the battery case 114 may be defined as a longitudinal direction of the battery cell 110, and between the side portion 114*c* and the connecting portion 115 connecting both end parts 114*a* and 114*b* of the battery case 114 may be defined as a width direction of the battery cell 110.

The connection portion 115 is an area extending long along one edge of the battery cell 110, and a protrusion portion 110*p* of the battery cell 110 may be formed at an end of the connection portion 115. The protrusion portion 110*p* may be formed on at least one of both end parts of the connection portion 115, and may protrude in a direction perpendicular to a direction in which the connecting portion 115 extends. The protrusion portion 110*p* may be located between one of the sealing portions 114*sa* and 114*sb* of both end parts 114*a* and 114*b* of the battery case 114 and the connection portion 115.

The battery case 114 is generally made of a laminate structure of a resin layer/metal thin film layer/resin layer. For example, in case where a surface of the battery case is made of an O (oriented)-nylon layer, when a plurality of battery cells are stacked to form a medium or large-sized battery module, they tend to slide easily due to external impact. Therefore, in order to prevent these problems and maintain a stable stacked structure of battery cells, an adhesive member, such as a cohesive adhesive such as a double-sided tape, or a chemical adhesive bonded by a chemical reaction upon bonding, can be attached to the surface of the battery case to form the battery cell stack 120. In the present embodiment, the battery cell stack 120 may be stacked in a X-axis direction, accommodated in the module frame 300 in a Z-axis direction, and cooled by a cooling member adjacent to the battery module. In a comparative example thereto, there is a case in which the battery cell is formed of a cartridge-type part, and the fixing between the battery cells is made by assembling the battery module frame. In such a comparative example, due to the presence of the cartridge-type part, the cooling action hardly proceeds, or may proceed in a surface direction of the battery cell, and cooling is not well performed in a height direction of the battery module.

Referring again to FIGS. 2 and 4, the end plate 150 may be located in a portion adjacent to the stacked surfaces of the battery cell stack in a direction perpendicular to a direction in which the electrode leads 111 and 112 of the battery cell 110 protrude.

Hereinafter, a structure for preventing swelling of a battery cell in the battery module according to the present embodiment will be described in detail with reference to FIGS. 7 and 8. FIG. 7 is a perspective view illustrating a coupling relationship between an upper plate and an end plate in the battery module of FIG. 3. FIG. 8 is a perspective view illustrating a coupling relationship between a module frame and an end plate in the battery module of FIG. 3.

Referring to FIGS. 2, 3 and 7, a first stepped portion 160 is formed on the upper end part of the end plate 150 contained in the battery module according to the present embodiment. The first stepped portion 160 may be formed when processing and molding the end plate 150. As shown in FIG. 7, the upper end part of the end plate 150 on which the first stepped portion 160 is formed has a structure that slightly protrudes in the Z-axis direction. In this case, the first hooking portion 400*h* of the upper plate 400 may be hooked to the first stepped portion 160. The upper plate 400 and the end plate 150 may be coupled to each other by welding in a state where the first hooking portion 400*h* is hooked to the first stepped portion 160.

The end plate 150 according to the present embodiment further includes a module mounting portion 152 formed on both outer edges of the first stepped portion 160. The module mounting portion 152 may be a structure used for configuring a battery pack by combining the battery module according to the present embodiment with a pack frame (not shown). For example, a mounting member (not shown) is inserted into the module mounting portion 152 to connect the pack frame (not shown) to the battery module. At this time, the module mounting portion 152 may correspond to the first cut-out part AP1 of the upper plate 400 described in FIG. 6, and the upper end part of the module mounting portion 152 may be opened by the first cut-out part AP1.

Referring to FIGS. 2, 3 and 8, a second stepped portion 170 is formed at the lower end part of the end plate 150. The second stepped portion 170 may be formed when processing and molding the end plate 150. As shown in FIG. 8, the lower end part of the end plate 150 on which the second stepped portion 170 is formed has a structure that slightly protrudes in the Z-axis direction. At this time, the second hooking portion 300*c* of the bottom portion 300*a* of the module frame 300 may be hooked to the second stepped portion 170. In a state in which the second hooking portion 300*c* is hooked to the second stepped portion 170, the bottom portion 300*a* of the module frame 300 and the end plate 150 may be coupled to each other by welding.

The module mounting portion 152 may correspond to the second cut-out part AP2 of the bottom portion 300*a* of the module frame 300 described in FIG. 6, and the lower end part of the module mounting portion 152 may be opened by the second cut-out part AP2.

According to the battery module structure according to the present embodiment described above, by rotating the position of the module frame by 90 degrees in the conventional U-shaped frame module structure, the end plate 150 is formed along the X-axis direction in which swelling of the battery cell occurs. Therefore, the end plate 150 allows direct control of swelling of the battery cell. The end plate 150 and the upper plate 400, and the end plate 150 and the module frame 300 are fixed by the structure of the hooking portions 400*h* and 300*c* and the stepped portions 160 and 170, and the fixed direction coincides with the X-axis direction in which swelling of the battery cell occurs, thereby effectively controlling problems caused by swelling of the battery cell. In addition, it is not necessary to increase the thickness of the end plate 150 and the thickness of the bottom surface of the module frame for controlling battery cell swelling, and so space utilization rate can be increased.

The first stepped portion 160 and the second stepped portion 170 described with reference to FIGS. 7 and 8 may have grooves formed at the upper and lower end parts of the end plate 150, respectively. Because the first and second hooking portions 400*h* and 300*c* are fixed to the first and second stepped portions 160 and 170 of the end plate 150, it is possible to prevent the upper plate 400 and the bottom portion 300*a* of the module frame 300 from protruding from the outermost surface of the end plate 150. Further, the first and second stepped portions 160 and 170 may serve as a guide at the time of assembling the end plate 150 with the upper plate 400 and the bottom portion 300*a* of the module frame 300.

Referring again to FIG. 2, the battery module 100 according to the present embodiment may further include a compression pad 119 that is located between the end plate 150 and the battery cell stack 120. The compression pad 119 is formed of an elastic member such as urethane foam, and thus, it is possible to further reduce swelling problems of the battery cell. In addition, the compression pad 119 maintains insulation between the end plate 150 and the battery cell stack 120.

Hereinafter, a modified embodiment of the present invention will be described with reference to FIGS. 9 to 11.

FIG. 9 is an exploded perspective view illustrating a battery module according to another embodiment of the present disclosure. FIG. 10 is a perspective view illustrating a coupling relationship between an upper plate and an end plate in the battery module of FIG. 9. FIG. 11 is a perspective view illustrating a coupling relationship between a module frame and an end plate in the battery module of FIG. 9.

Referring to FIGS. 9 and 10, the battery module according to the present embodiment further includes an insulating cover 140 that is located between the end plate 150 and the battery cell stack 120. The insulating cover 140 may be formed of a plastic injection-molded material. As shown in FIG. 10, the width of the insulating cover 140 in the Z-axis direction is larger than the width of the end plate 150 in the Z-axis direction. The insulating cover 140 extends above the upper end surface of the end plate 150. At this time, a first stepped portion 160 is formed between the upper end part of the insulating cover 140 in the Z-axis direction and the upper end part of the end plate 150, and the first hooking portion 400*h* of the upper plate 400 may be hooked to the first stepped portion 160. Specifically, the insulating cover 140 formed inside the end plate 150 is receded by the thickness of the end plate 150, and a step difference is formed by a portion of the insulating cover 140 protruding from the upper end surface of the end plate 150 in the Z-axis direction and the upper end surface of the end plate 150. The upper plate 400 and the end plate 150 may be coupled to each other by welding in a state in which the first hooking portion 400*h* is locked to such a step difference.

Referring to FIGS. 9 and 11, the insulating cover 140 extends below the lower end part of the end plate 150. At this time, a second stepped portion 170 is formed between the lower end part of the insulating cover 140 in the Z-axis direction and the lower end part of the end plate 150, and the second hooking part 300*c* of the bottom portion 300*a* of the module frame 300 may be hooked to the second stepped portion 170. Specifically, the insulating cover 140 formed inside the end plate 150 is receded by the thickness of the end plate 150, and a step difference is formed by a portion of the insulating cover 140 protruding from the lower end surface of the end plate 150 in the Z-axis direction and the lower end surface of the end plate 150. In a state in which the second hooking portion 300*c* is hooked to such a step difference, the bottom portion 300*a* of the module frame 300 and the end plate 150 may be coupled to each other by welding.

Meanwhile, one or more battery modules according to an embodiment of the present disclosure can be packaged in a pack case to form a battery pack.

The above-mentioned battery module and a battery pack including the same may be applied to various devices. These devices may be applied to vehicles such as an electric bicycle, an electric vehicle, a hybrid vehicle, but the present disclosure is not limited thereto but can be applied to various devices that can use the battery module and the battery pack including the same, which also belongs to the scope of the present disclosure.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: module frame
140: insulating cover
150: end plate
152: module mounting portion
160: first stepped portion
170: second stepped portion
300: module frame
400: upper plate
400*h*: first hooking portion
300*c*: second hooking portion

The invention claimed is:

1. A battery module comprising:

a battery cell stack having a plurality of battery cells stacked in a stacking direction, a module frame accommodating the battery cell stack and having an opened upper portion, an upper plate covering the battery cell stack on the upper portion of the module frame, a busbar frame connected to the battery cell stack, and end plates located on opposing sides of the battery cell stack along the stacking direction, wherein the module frame has a structure for opening the battery module along the stacking direction, wherein the end plates cover a surface of the battery cell stack on opposing sides of the module frame, wherein the module frame is a plate shaped structure bent to form a continuous U-shape defined by a bottom portion and two side surface portions facing each other, wherein the busbar frame is located between one of the two side surface portions and the battery cell stack, wherein the end plates are oriented along a width direction, the width direction being perpendicular to the stacking direction, wherein a first cut-out part is formed at each of four corners of the upper plate, and wherein the two side surface portions extend from the bottom portion to above a midpoint of a height of the plurality of battery cells.

2. The battery module of claim 1, further comprising, an insulating plate located between the busbar frame and a side surface portion of the module frame.

3. The battery module of claim 1, wherein a first hooking portion protruding downward is formed on both sides of the upper plate.

4. The battery module of claim 3, wherein each of the end plates has a first stepped portion formed at an upper end part, and the first hooking portion is hooked to the first stepped portion.

5. The battery module of claim 4, wherein a second hooking portion protruding upward is formed on both sides of a bottom portion of the module frame.

6. The battery module of claim 5, wherein a second stepped portion is formed at a lower end part of each of the end plates, and the second hooking portion is hooked to the second stepped portion.

7. The battery module of claim 6, wherein the first stepped portion and the second stepped portion form a groove structure at each of the upper end part and the lower end part of each of the end plates.

8. The battery module of claim 6, wherein each of the end plates has a module mounting portion formed on both outer edges of the first stepped portion.

9. The battery module of claim 8, wherein the first cut-out part is formed in the upper plate to correspond to the module mounting portion, and an upper end part of the module mounting portion is accessible through the first cut-out part.

10. The battery module of claim 9, wherein a second cut-out part is formed at the bottom portion of the module frame to correspond to the module mounting portion, and a lower end part of the module mounting portion is accessible through the second cut-out part.

11. The battery module of claim 4, further comprising, a compression pad located between the end plates and the battery cell stack.

12. The battery module of claim 4, further comprising, an insulating cover located between the end plates and the battery cell stack.

13. The battery module of claim 12, wherein a width of the insulating cover in a Z-axis direction, perpendicular to the stacking direction, is larger than a width of the end plates in the Z-axis direction, the first stepped portion is formed between an upper end part of the insulating cover in the Z-axis direction and an upper end part of the end plates, and the first hooking portion is hooked to the first stepped portion.

14. The battery module of claim 13, wherein a second hooking portion projecting upward is formed on both sides of a bottom portion of the module frame.

15. The battery module of claim 14, wherein a second stepped portion is formed between a lower end part of the insulating cover in the Z-axis direction and a lower end part of the end plates, and the second hooking portion is hooked to the second stepped portion.

16. The battery module of claim 1, wherein the end plates are formed of a metal material.

17. A battery pack comprising the battery module of claim 1.

18. A battery pack comprising the battery module of claim 1, wherein each of the opposing sides of the module frame define an opening.

19. The battery module of claim 1, wherein module mounting portions of each of the end plates are accessible through respective ones of the first cut-out parts.

* * * * *